United States Patent [19]
England et al.

[11] Patent Number: 5,871,652
[45] Date of Patent: Feb. 16, 1999

[54] METHOD FOR HIGH VOLUME PIPELINE WATER FILTRATION

[75] Inventors: Dale England, Liberty; Harvey Futrell, The Woodlands; Gunnar Kopp, Houston, all of Tex.

[73] Assignee: Pipetronics, Inc., Houston, Tex.

[21] Appl. No.: 511,305

[22] Filed: Aug. 4, 1995

[51] Int. Cl.⁶ .................................................. B01D 37/00
[52] U.S. Cl. ........................ 210/741; 210/779; 210/791; 210/797; 210/805; 210/106; 210/143; 210/921
[58] Field of Search ................................ 210/532.2, 188, 210/90, 130, 109, 111, 112, 741, 779, 791, 797, 805, 106, 143, 921

[56] References Cited

U.S. PATENT DOCUMENTS

| | | | |
|---|---|---|---|
| 4,002,561 | 1/1977 | Traverse | 210/532.2 |
| 4,374,028 | 2/1983 | Medina | 210/669 |
| 4,578,198 | 3/1986 | Schmidt et al. | 210/780 |
| 4,865,631 | 9/1989 | Stoby et al. | 210/532.2 |
| 4,895,649 | 1/1990 | Brandt et al. | 210/195.2 |
| 5,069,780 | 12/1991 | Thalmann et al. | 210/90 |
| 5,091,016 | 2/1992 | Krajicek et al. | 134/22.1 |
| 5,122,193 | 6/1992 | Derlein . | |
| 5,129,957 | 7/1992 | Sheppard et al. | 134/22.11 |
| 5,178,755 | 1/1993 | LaCrosse | 210/195.1 |
| 5,282,972 | 2/1994 | Hanna et al. | 210/652 |
| 5,336,333 | 8/1994 | Sheppard et al. | 134/22.1 |
| 5,364,534 | 11/1994 | Anselme et al. | 210/650 |
| 5,374,351 | 12/1994 | Bolton et al. | 210/106 |
| 5,427,679 | 6/1995 | Daniels | 210/532.2 |
| 5,578,908 | 11/1996 | Mondragon, Jr. | 210/532.2 |

Primary Examiner—Robert Popovics
Attorney, Agent, or Firm—Fulbright & Jaworski LLP

[57] ABSTRACT

A method and apparatus for filtering particulates from a turbid liquid is provided. The apparatus is preferably used to filter particulates from water used to flush a pipeline after a cleaning operation, after hydrostatic testing or during product displacement at a high flow rate. The apparatus includes an inlet valve for receiving the turbid liquid from a liquid source connected to a gas buster for discharging the turbid liquid and air into a break tank located beneath the gas buster. A self-cleaning portable liquid filter having an inlet is connected to an outlet of the break tank and includes a screen filter for receiving the turbid liquid from the break tank. Particulates from the turbid water are accumulated on an internal surface of the screen filter and clean water is discharged from the filter through a discharge port. A flush mechanism is provided to rinse the accumulated particulate cake from the surface of the screen filter upon actuation of an automatic rinse cycle. A sludge tank is located below the filter and flush mechanism for capturing a flush liquid and the particulates. A centrifugal pump driven flush line having a first end connected to the sludge tank and a second end connected to the break tank is provided for recirculating the flush liquid and accumulated particulates from the sludge tank to the break tank to be re-filtered. The turbid liquid is received from the pipeline through the inlet valve and discharged through the gas buster into the break tank. Where a plurality of break tanks are provided, the fluid levels are equalized. The turbid liquid is then pumped from the break tank to the self-cleaning portable liquid filter and a clean liquid is discharged from the outlet thereof. An automatic rinse cycle is engaged upon actuation of a signal triggered by sensing of a predetermined pressure differential across an inlet and an outlet of the screen filter.

4 Claims, 4 Drawing Sheets

METHOD FOR HIGH VOLUME PIPELINE WATER FILTRATION

BACKGROUND OF THE INVENTION

The present invention relates to an apparatus for filtering particulates from a liquid at a high flow rate, and more particularly to an apparatus for filtering particulates from water exiting an oil or gas pipeline during a chemical pipeline cleaning operation, dewatering after hydrostatic testing, product displacement or the like.

In the oil and gas pipeline industry, there is occasionally a need to clean and inspect the numerous pipelines in use for transporting petroleum products. There is also a need to perform hydrostatic testing on the pipeline or to displace a product in the pipeline to properly maintain the pipeline. Water is normally used to flush the pipeline after these types of operations have been performed. Gas, oil, chemical cleaner residue and other particulate matter may accumulate in the pipeline and are carried in the flush water. This creates a problem with disposal of the flush water upon completion of the operation. The water is of such a high turbidity that it cannot be introduced directly into a nearby body of water. Therefore, there is a need for a method and apparatus for processing a high volume of water and filtering these particulates from the water so that it can be reintroduced directly into the surrounding environment.

SUMMARY OF THE INVENTION

An object of the present invention is to provide a liquid filtration system wherein a high volume of liquid can be processed quickly. It is a further object to provide a high volume liquid filtration system wherein the water to be discharged from the system is clean and environmentally safe enough to be introduced directly into a natural body of water. It is a further object of the invention to provide a method and apparatus whereby turbid water used to flush an oil or gas pipeline after a chemical cleaning operation, after hydrostatic testing, or during product displacement can be quickly and easily stripped of particulate matter.

Thus in accomplishing the foregoing objects, there is provided in accordance with one aspect of the present invention an apparatus for filtering particulates from a turbid liquid comprising an inlet valve for receiving said turbid liquid from a liquid source; liquid discharge means connected to said inlet valve for discharging said turbid liquid and air; a break tank located beneath said liquid discharge means for receiving said turbid liquid as it is discharged from said liquid discharge means; and a self-cleaning portable liquid filter having an inlet connected to an outlet of said break tank. The self-cleaning portable liquid filter preferably comprises a screen filter for receiving said turbid liquid from said break tank and accumulating said particulates on an internal surface thereof, and a filter discharge port located downstream from said screen filter for discharging a clean liquid from said liquid filter. The apparatus according to one aspect of the invention further comprises a sludge tank located below said liquid filter for capturing a flush liquid and said accumulated particulates upon actuation of an automatic rinse cycle; and a flush line having a first end connected to said sludge tank and a second end connected to said break tank for recirculating the flush liquid and said accumulated particulates from the sludge tank to the break tank to be re-filtered.

The liquid discharge means may comprise one or more gas busters, each comprising a plurality of random lengths of welded pipe attached to an oversized length of pipe, said oversized length of pipe exhibiting a plurality of slots in an underside thereof for discharging said turbid liquid and air. The break tank may preferably comprise a plurality of break tanks coupled to one another by connecting hoses. According to one aspect of the invention, each break tank may exhibit a plurality of vertical partitions therein to promote settling of larger particles. According to one embodiment, each break tank includes two or three such partitions. One or more centrifugal pumps may be provided to pump the turbid liquid from the break tank to the self-cleaning portable liquid filter. Each pump may be provided with means for adjusting and controlling the discharge rate thereof. The screen filter may include a first coarse screen for removing large particulates, and a second fine screen, such as a 50 micron screen, for removing smaller particulates. A discharge valve, turbine and/or fine 1 micron filter may be located downstream from said discharge valve.

The apparatus for filtering particulates from a turbid liquid according to one embodiment of the invention may further comprise a flush mechanism having an inlet connected to said liquid filter and an outlet for discharging said flush liquid and said particulates into said sludge tank. The flush mechanism according to one aspect may be comprised of a hollow flush tube exhibiting a plurality of flush nozzles, said flush tube extending into an interior of said fine screen filter for receiving said flush liquid and said particulates upon activation of said automatic rinse cycle; a radial flow flush impeller connected to a distal end of said flush tube, said impeller exhibiting a plurality of radial outlets in fluid communication with an interior or said hollow flush tube; a hydraulic cylinder connected to said flush tube and said flush impeller for axially driving said flush mechanism between a filtration cycle position and a rinse cycle position; and a plurality of flush valves attached to a housing of said self-cleaning portable liquid filter. Each flush valve may exhibit an inlet which is in fluid communication with the outlets of the flush impeller when said flush mechanism is in the rinse cycle position, and an outlet which empties into said sludge tank.

According to a further aspect of the present invention, provided is a method for filtering particulates from a turbid liquid comprising the steps of receiving said turbid liquid from a liquid source through an inlet valve; discharging said turbid liquid and air into a break tank; filling said break tank with said turbid liquid; pumping said turbid liquid from said break tank to a self-cleaning portable liquid filter; filtering said turbid liquid through a screen filter, thereby accumulating said particulates on an internal surface of said screen filter; discharging a clean liquid from an outlet of said liquid filter; and engaging an automatic rinse cycle upon actuation of a signal triggered by sensing of a predetermined pressure differential across an inlet and an outlet of said screen filter. The step of engaging an automatic rinse cycle may further include the steps of rinsing the accumulated particulates from said filter screen with a flush liquid; depositing said flush liquid and said accumulated particulates into a sludge tank located below said filter screen; and pumping said flush liquid and said accumulated particulates from said sludge tank to said break tank to be re-filtered.

The step of rinsing the accumulated particulates from said filter screen with a flush liquid may further comprise the steps of actuating a hydraulic cylinder to move a flush mechanism from a filtration cycle position to a rinse cycle position; backflowing flush water through said filter screen by applying a suction to the flush mechanism; directing said flush water and said accumulated particulates into flush nozzles provided on a flush tube extending into the interior of the screen filter; and discharging said flush water and said accumulated particulates from the flush mechanism into said sludge tank.

The step of filling said break tank may include filling a first break tank with said turbid liquid; filling a second break tank with said turbid liquid from said first break tank; equalizing the turbid liquid in the first break tank with the turbid liquid in the second break tank; filling a third break tank with said turbid liquid from said second break tank; and equalizing the turbid liquid in said first, second and third break tanks.

Other and further objects, features and advantages will be apparent and eventually more readily understood from a reading of the following specification and accompanying drawings, wherein examples of the presently preferred embodiments of the invention are given for the purpose of disclosure.

DESCRIPTION OF PREFERRED EMBODIMENTS

Figure 1:
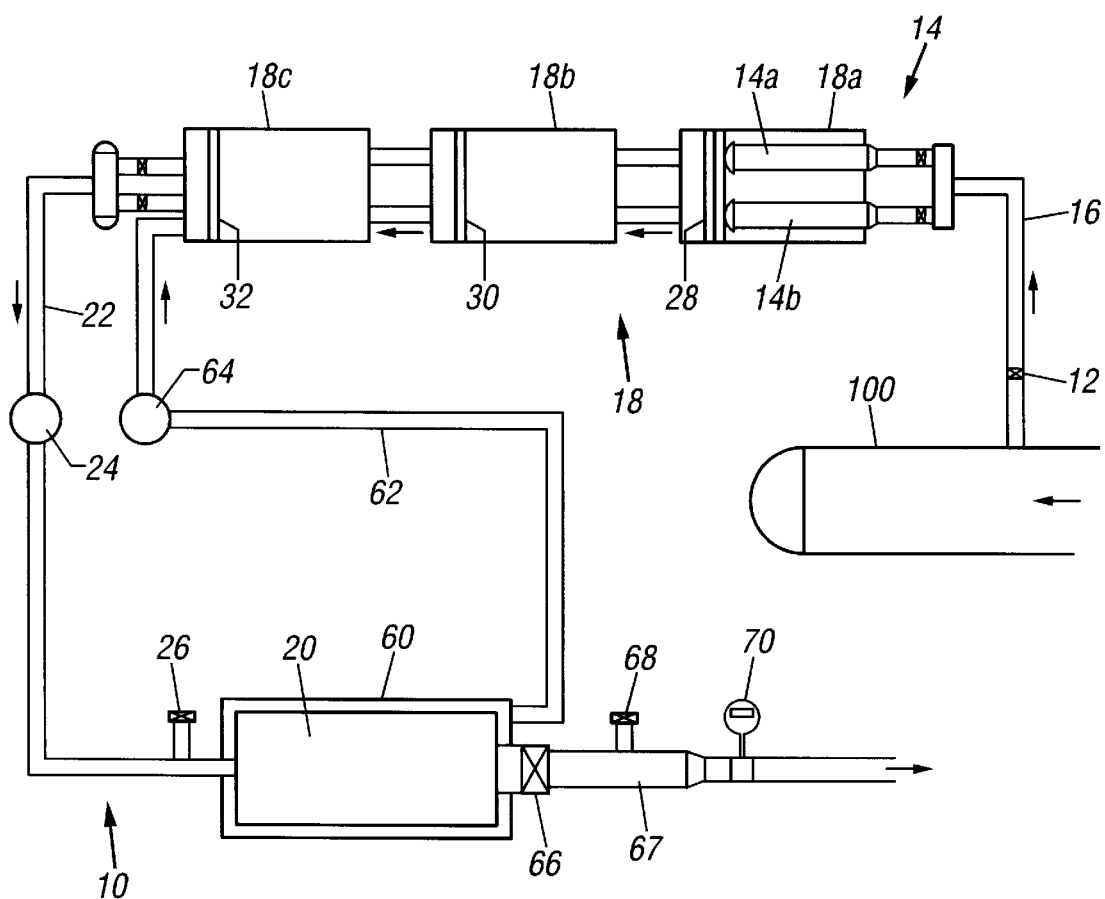
FIG. 1 is a diagrammatic representation of an apparatus for filtering particulates from a turbid liquid according to a first embodiment of the present invention.

As shown in FIG. 1, a high volume liquid filtration apparatus 10 for filtering particulates from a turbid liquid according to one embodiment of the present invention generally comprises a full opening inlet valve 12 for receiving a turbid liquid from a liquid source, such as a pipeline 100, liquid discharge means 14 connected by a length of pipe 16 to the full opening inlet valve 12; a break tank 18 located beneath the liquid discharge means 14 for receiving the turbid liquid as it is discharged from the liquid discharge means 14; and a self-cleaning portable liquid filter 20 having an inlet connected to an outlet of the break tank 18. The inlet of the liquid filter 20 may be connected to the outlet of the break tank 18 by a length of pipe or hose 22 having a centrifugal pump 24 connected in-line for transporting the turbid liquid from the break tank 18 to the liquid filter 20. A sample point 26 with an attached valve may be connected to the length of pipe or hose 22 for removing selected amounts of turbid liquid for analysis. The rate of turbid liquid discharge from the break tank 18 may be controlled by adjustment of the throttle of the centrifugal pump 24. According to one embodiment of the invention, the liquid source is an oil/gas pipeline 100 and the turbid liquid is water.

The liquid discharge means, as shown in the embodiment of FIG. 1, may comprise a pair of gas busters 14a, 14b connected in parallel to the length of pipe 16. According to one aspect of the invention, each gas buster 14a, 14b may exhibit a plurality of random lengths of welded pipe attached to an oversized length of pipe exhibiting a plurality of slots in an underside thereof. The turbid liquid and air are discharged from the plurality of slots into the break tank 18.

As shown in FIG. 1, the break tank 18 may comprise a plurality of break tanks 18a, 18b, and 18c coupled to one another by connecting hoses. The first break tank 18a is preferably located beneath the gas busters 14a and 14b, as shown in FIG. 1, for receiving the turbid liquid discharged therefrom. An expanded metal strainer 28 may be located within the first break tank 18a for trapping large particles. An outlet of the first break tank 18a is connected to a suction inlet of a second break tank 18b. A mesh screen 30 may be placed in the second break tank 18b for trapping large particle that passed through the expanded metal strainer 28 of the first break tank 18a. An outlet of the second break tank 18b is connected to a suction inlet of a third break tank 18c. A mesh screen 32 may also be placed in the third break tank 18c for trapping large particle that passed through both the expanded metal strainer 28 of the first break tank 18a, and the mesh screen 30 of the second break tank 18b. The mesh screens 30 and 32 may be of any density or configuration desired. According to one aspect of the present invention, a 50 mesh screen (50 mesh/square inch) is used in each break tank. The break tanks 18a, 18b, 18c may be of any desired volume to accommodate a particular application of the apparatus. According to one aspect of the invention, each break tank exhibits a volume of approximately 180 barrels. According to the embodiment of the invention shown in FIG. 1, the centrifugal pump 24 exhibits an inlet connected to the outlet of the third break tank 18c via connecting pipe or hose 22, and an outlet connected to the self-cleaning portable liquid filter 20 via connecting pipe or hose 22.

Figure 3:
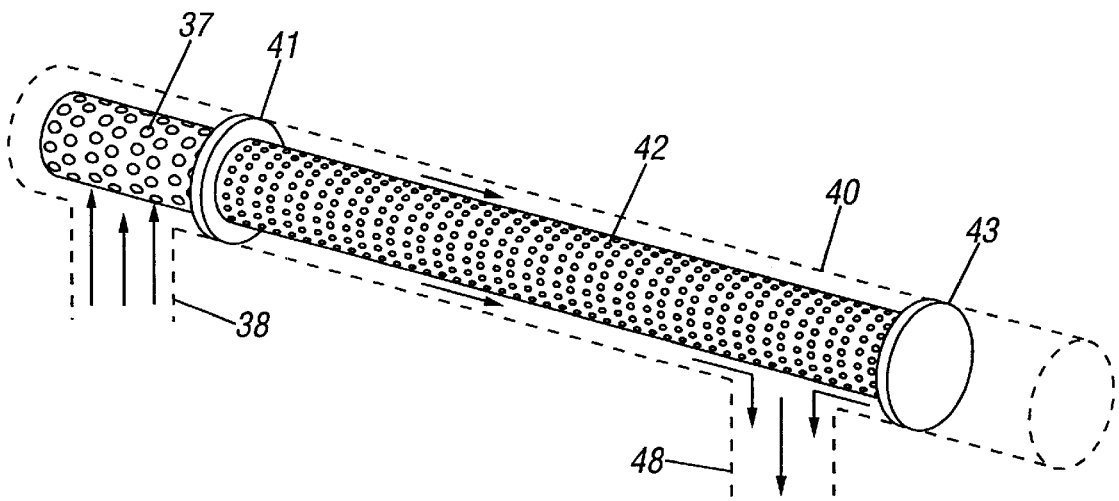
FIG. 3 is a perspective view of a coarse filter screen and a fine filter screen shown within a filter tube of the liquid filter unit shown in FIG. 2.
Figure 2:
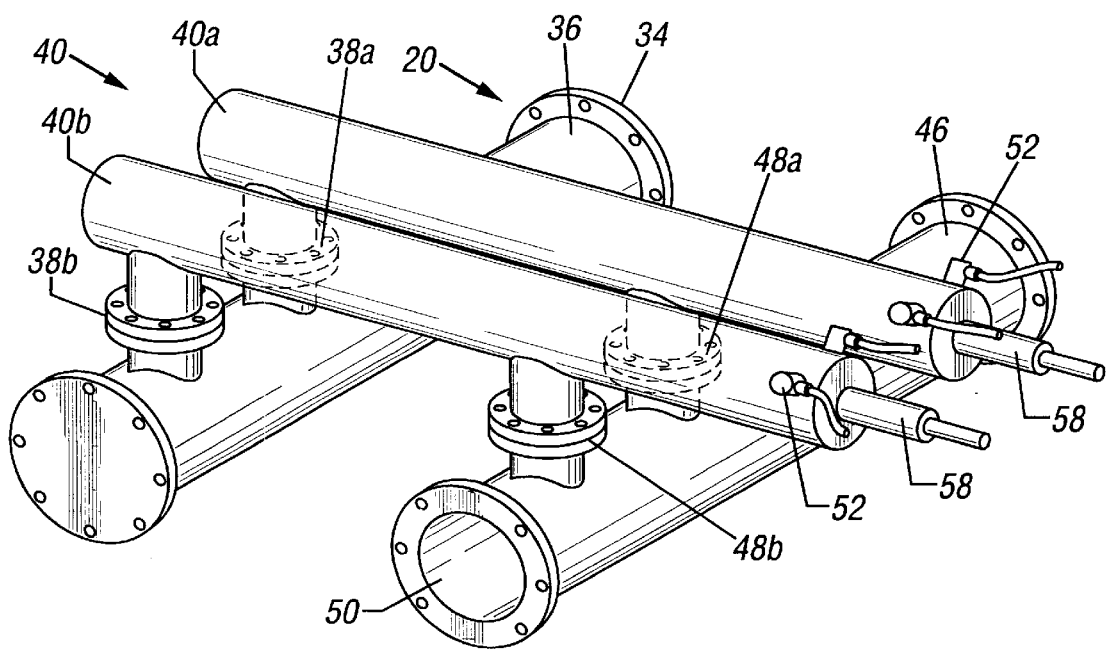
FIG. 2 is a perspective view of a liquid filter unit of the apparatus shown in FIG. 1.

According to one aspect of the invention, as shown in FIG. 2, the self-cleaning portable liquid filter 20 may comprise a filter inlet port 34 through which the turbid liquid from the break tanks 18 is introduced into the filter. The turbid liquid passes through the inlet port 34 into an inlet tube 36. A filter tube 40 is attached to the inlet tube by an inlet flange 38. According to the embodiment shown in FIG. 2, two filter tubes 40a and 40b are used. Each filter tube 40a, 40b houses a coarse screen filter 37 and a fine screen filter 42, as shown in FIG. 3. A seal 41 is provided between the coarse filter 37 and the fine filter 42 to prevent the turbid water entering the coarse filter via inlet flange 38 from mixing with the filtered water exiting through the fine filter 42 and outlet flange 48. A seal 43 is also provided at the free end of the fine filter 42 to prevent escape of clean water through the flush mechanism. According to one embodiment of the present invention, the fine screen filter is a 50 micron screen filter. Each filter tube 40a, 40b is also connected to an outlet tube 46 through connecting flanges 48a, 48b, respectively. Finally, a clean liquid is discharged from a filter discharge port 50 located in an end of the outlet tube 46.

A plurality of flush heads 52 are connected to an end section of each filter tube 40a, 40b for discharging flush water and particulate matter accumulated on the fine screen filter 42 upon actuation of the automatic rinse cycle. The accumulated particulates and flush water are flushed from the filter tubes 40a, 40b, through the flush heads 52 and into the sludge tank 60. According to one embodiment of the present invention, each filter tube exhibits three flush heads 52, which are connected to a larger (approximately 8" in diameter) discharge tube by way of a corresponding plurality of connecting hoses. The flush water and particulate matter is discharged from the larger discharge tube into the sludge tank 60.

Figure 4A:
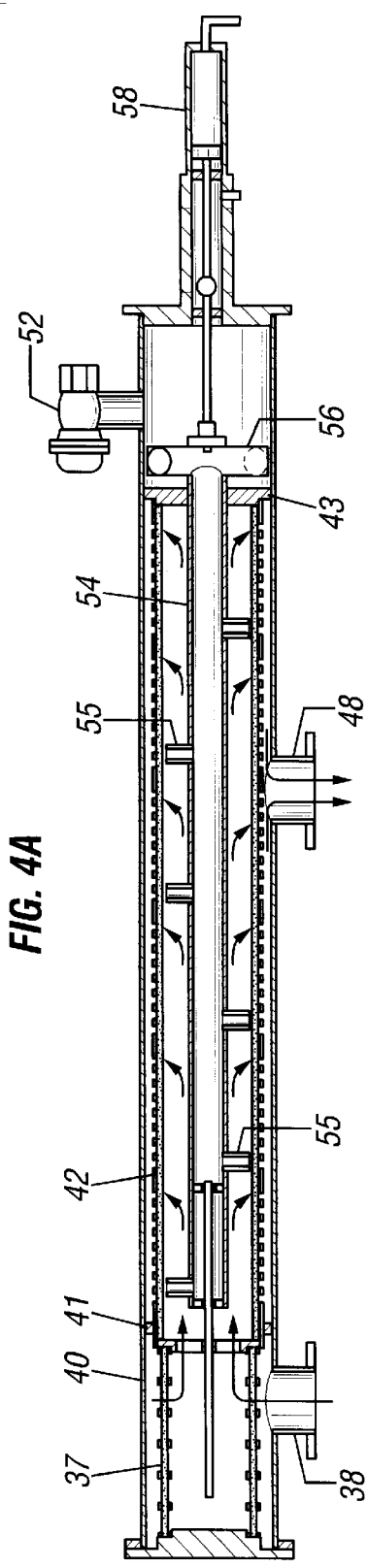
FIG. 4A is schematic drawing showing flow patterns within the filter tube shown in FIG. 3 in the normal operating mode before initiation of the rinse cycle.
Figure 4B:
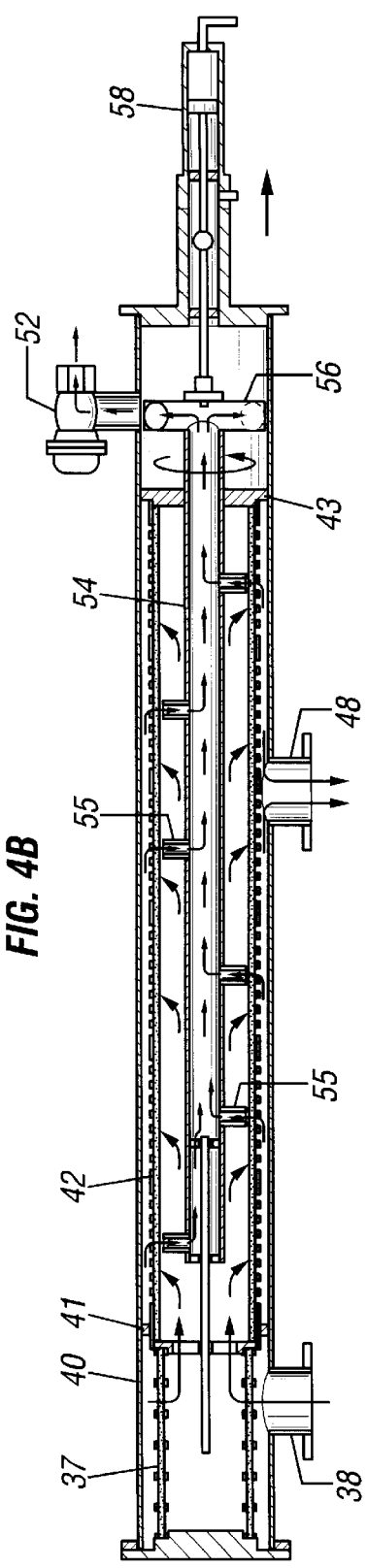
FIG. 4B is schematic drawing showing flow patterns within the filter tube shown in FIG. 3 during the rinse cycle.
Figure 4C:
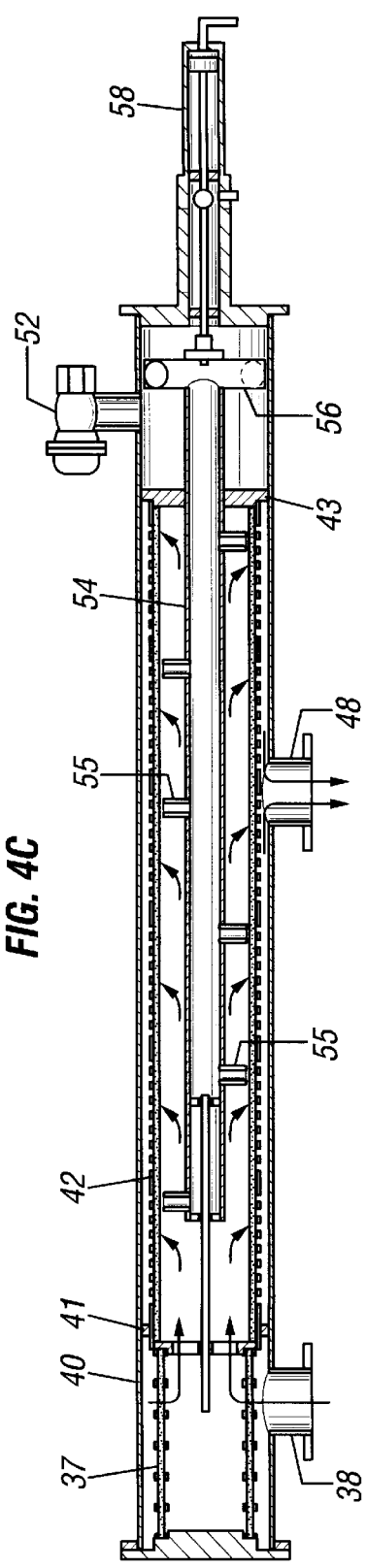
FIG. 4C is schematic drawing showing flow patterns within the filter tube shown in FIG. 3 after the rinse cycle.

As shown in FIGS. 4A–4C, the filter flush mechanism may be comprised of a hollow flush tube 54 extending inside of and along the longitudinal axis of the fine screen filter 42, over substantially the entire length of the fine screen filter. The flush tube 54 may exhibit a plurality of flush nozzles 55 extending radially outwardly from a surface thereof toward the inner surface of the fine screen filter 42. A radial flow flush impeller 56 is provided at the end of the hollow flush tube 54 which is adjacent to the flush nozzles 55. The flush tube 54 may also be connected at one end thereof to a hydraulic cylinder 58 which imparts movement to the flush tube 54, flush nozzles 55 and flush impeller 56 along the longitudinal axis of the flush tube upon actuation of the automatic rinse cycle.

In the normal filtration mode, as shown in FIG. 4A, turbid water enters the filter tube 40 through inlet flange 38 and passes through the openings in the coarse screen filter 37 to the interior thereof. The water then flows along the outer surface of the flush tube 54 along the length of the filter tube and passes through the fine screen filter 42 to the exterior surface thereof. The filtered water is then discharged from the filter tube through outlet flange 48. During the normal filtration mode, water does not enter any of the components of the flush mechanism.

As water continues to flow through the liquid filter 20, a filter cake accumulates on the internal surface of the fine screen 42. As differential pressure increases across the inlet and outlet of the fine screen 42 to a predetermined pressure differential, a signal is sent to the rinse controller which engages an automatic rinse cycle. The rinse controller signals each hydraulic cylinder 58 to move the flush tube 54 from the closed, filtration mode position shown in FIG. 4A, to the open, flush mode position shown in FIG. 4B. In the flush mode, water enters the through the exterior of the coarse filter 37 to the interior, passes along the length of the filter tube and exits through the fine filter 42 to the exterior surface thereof, as in the normal filtration mode. A portion of this discharged clean water passes back through the fine screen 42 into the flush nozzles 55, and the remainder of the clean water is discharged through the outlet flange 48. As the water passes back through the fine screen and into the flush nozzles 55, the accumulated cake on the interior surface of the fine screen is carried with the flush water. The flushing action is created by suction applied by the flushing heads 52. The flush water and accumulated particulate matter from the interior surface of the fine screen are drawn through the flush nozzles 55 into the flush tube 54, and are ejected through the flush impeller 56 into the tubes connected to the flush heads. The flush water and particulates are then deposited into the sludge tank 60. According to one embodiment of the invention, the flush tube 54, flush nozzles 55 and flush impeller 56 rotate during the flush cycle to provide more effective cleaning of the interior surface of the fine screen filter 42. FIG. 4C shows the filter mechanism with a clean filter prior to the piston return stroke. The piston of the hydraulic cylinder may then be returned to the position shown in FIG. 4A for normal filtration.

The sludge tank 60, as shown in FIG. 1, may be located below said liquid filter 20 for capturing the flush liquid and the particulates accumulated on the fine screen filter 42 upon actuation of the automatic rinse cycle. A flush line 62 having a first end connected to said sludge tank 60 and a second end connected to said break tank 18 may be provided for recirculating the flush liquid and accumulated particulates from the sludge tank 60 to the break tank to be re-filtered. A centrifugal pump 64 may be located along said flush line 62 for transporting the flush liquid and accumulated particulates through the flush line 62 to the break tank 18.

Figure 5:
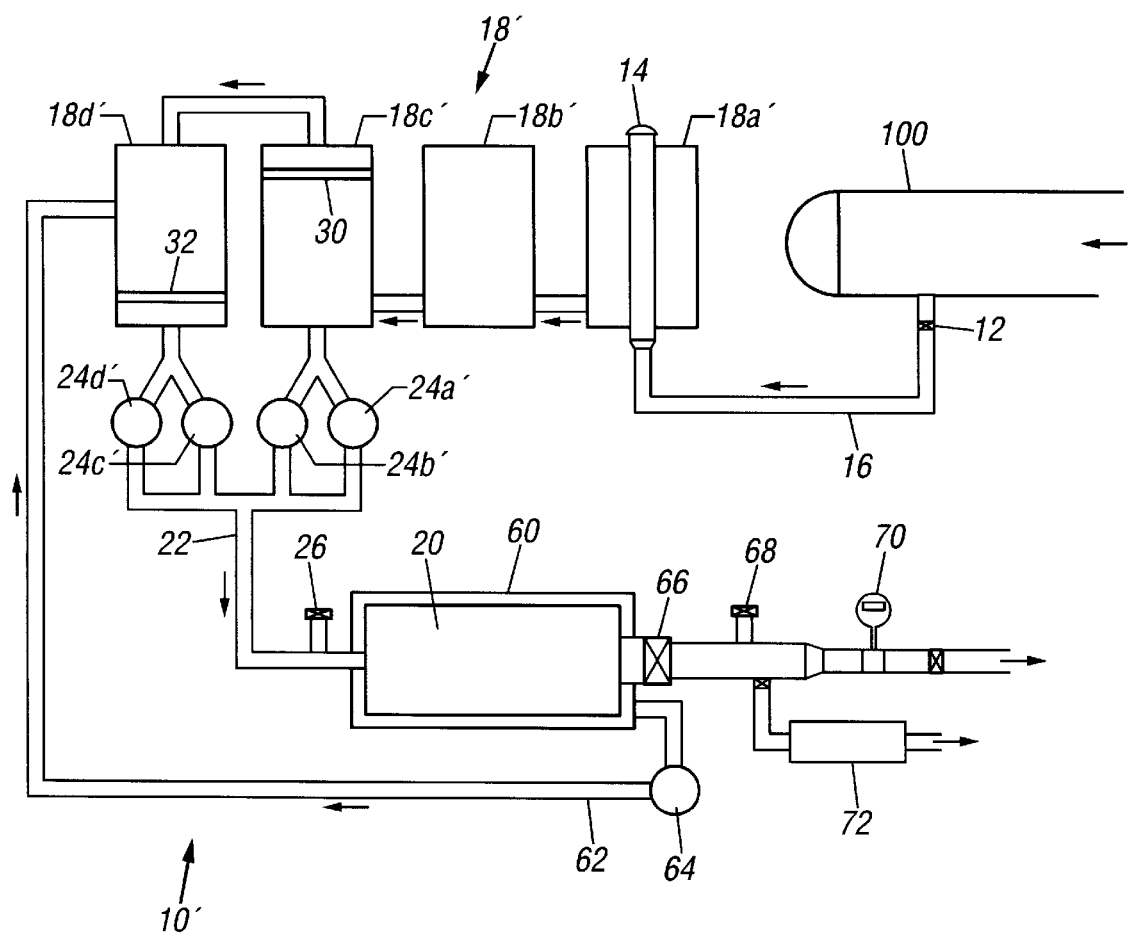
FIG. 5 is a diagrammatic representation of an apparatus for filtering particulates from a turbid liquid according to a second embodiment of the present invention.

As shown in FIG. 1, a discharge valve 66 may be located downstream from the filter discharge port of the liquid filter 20. A sample point 68 with a valve attached for removing selected amounts of water for analysis and a turbine flow meter 70 may also be located downstream from the discharge valve according to one embodiment of the invention. As shown in FIG. 5, a 1 micron filter 72 may also be located downstream from the discharge valve 66 to provide additional filtration of the liquid prior to discharge into the environment.

The high volume liquid filtration apparatus 10', as shown in FIG. 5, is substantially similar to the apparatus shown in FIG. 1, wherein like reference numerals indicate like components. The embodiment of FIG. 5, differs from the embodiment of FIG. 1 mainly in the configuration of break tanks 18' and centrifugal pumps 24' for transporting the turbid liquid to the liquid filter 20. The embodiment of FIG. 5 shows four break tanks 18a', 18b', 18c', 18d' connected by connecting hoses or pipes to the adjacent tanks. The third break tank 18c' and the fourth break tank 18d' are each connected to the filter 20 by length of pipe 22. Each break tank 18c', 18d' has a pair of parallel centrifugal pumps 24a', 24b' and 24c', 24d', respectively, connected to an outlet thereof. The additional centrifugal pumps provide a means for adjusting the flow rate of liquid from the break tanks to the filter.

The process of filtering a liquid using the apparatus of the present invention is now described in accordance with one particular aspect of the invention. The liquid to be filtered as described herein is turbid water which has been used to flush a pipeline after a chemical cleaning, dewatering, product displacement or the like. The turbid water is introduced into the filtration device directly from the pipeline. It is understood that this particular environment is but one in which the method and apparatus of the present invention can be used and other environments are not to be excluded by the description contained herein.

The water to be filtered leaves the pipeline 100 and enters the filtration cycle through a length of pipe 16 to which a full opening valve 12 has been attached. The turbid liquid passes through the valve 12 and enters into a pair of parallel gas busters 14a, 14b situated on top of a first break tank 18a. The gas busters 14a, 14b each have slots in the undersides thereof through which the turbid water and air are discharged into the first break tank 18a. The water fills the first break tank 18a and discharges through an outlet of the first break tank through a connection hose or pipe and enters the suction of a second break tank 18b. After filling the second break tank 18b and equalizing with the first break tank 18a, the water exits the second break tank 18b through a connection hose and enters the suction of the third break tank 18c. The water fills the third break tank 18c and the total accumulated water located in the three break tanks are equalized through the connection hoses.

The liquid is then transported from the third break tank 18c through connecting hose 22 to the water filter 20, by way of centrifugal pump 24. The required discharge rate of the centrifugal pump 24 may be obtained by adjusting the throttle of the pump, or by adding additional centrifugal pumps in parallel, as shown in FIG. 5. The water liquid enters the water filter 20 through an inlet port (now shown). Water enters the inlet tube 36 and into the filter tubes 40a, 40b and is filtered through the coarse filters 37 and the 50 micron filter screens 42 located therein, as shown in FIG. 4A. As water passes through the filter screens, dirt and particulate matter which cannot pass through the screen openings accumulate on the internal screen surface. The filtered water then passes through the fine screen filters 42, and through flanges 48a, 48b into the outlet tube 46 and out of the water filter through outlet port 50. The discharged clean water then passes through a discharge valve 66 into a length of pipe 67. If desired, additional filtration can be accomplished by piping the discharged water through an absolute rated 1 micron filter 72.

As water continues to flow through the filter 20, a filter cake accumulates on the fine screen 42. As differential pressure increases across the inlet and outlet of the fine screen 42 to a predetermined pressure differential, a signal is sent to the rinse controller which engages an automatic rinse cycle. The accumulated particulates are rinsed from the internal surface of the fine filter screen 42 with a flush liquid. A hydraulic cylinder 58 is actuated to move the flush mechanism from a filtration cycle position, as shown in FIG. 4A, to a rinse cycle position, as shown in FIG. 4B. The flush water is then backflowed through said fine filter screen 42 by applying a suction to the flush mechanism. The flush water and accumulated particulates are then directed into the flush nozzles 55 provided on the flush tube 54 extending into the interior of the fine screen filter 42. Finally, the flush water and accumulated particulates are discharged from the flush mechanism into the sludge tank 60. The flush water and accumulated particulates may then be pumped through the return pipe 62 to the break tank 18c for re-filtering.

The present invention, therefore, is well adapted to carry out the objects and attain the ends and advantages mentioned as well as others inherent therein. While presently preferred embodiments of the invention are given for the purpose of disclosure, numerous changes in the details will readily suggest themselves to those skilled in the art and which are encompassed within the spirit of the invention and the scope of the appended claims.

We claim:

1. A method for filtering particulates from a turbid liquid comprising the steps of:
    receiving said turbid liquid from a liquid source through an inlet valve;
    discharging said turbid liquid into a break tank;
    filling said break tank with said turbid liquid;
    pumping said turbid liquid from said break tank to a self-cleaning portable liquid filter;
    filtering said turbid liquid through a screen filter, thereby accumulating said particulates and contaminants on an internal surface of said screen filter;
    discharging a clean liquid from an outlet of said liquid filter;
    engaging an automatic rinse cycle upon actuation of a signal triggered by sensing of a predetermined pressure differential across an inlet and an outlet of said screen filter, wherein said step of engaging an automatic rinse cycle comprises:
        rinsing the accumulated particulates from said filter screen with a flush liquid;
        depositing said flush liquid and said accumulated particulates into a sludge tank located below said filter screen; and
        pumping said flush liquid and said accumulated particulates from said sludge tank to said break tank to be re-filtered.

2. The method for filtering particulates from a turbid liquid according to claim 1, wherein said step of rinsing the accumulated particulates from said filter screen with a flush liquid comprises the steps of:
    actuating a hydraulic cylinder to move a flush mechanism from a filtration cycle position to a rinse cycle position;
    backflowing flush water through said filter screen by applying a suction to the flush mechanism;
    directing said flush water and said accumulated particulates into flush nozzles provided on a flush tube extending into the interior of the screen filter; and
    discharging said flush water and said accumulated particulates from the flush mechanism into said sludge tank.

3. A method for filtering particulates from a turbid liquid comprising the steps of:
    receiving said turbid liquid from a liquid source through an inlet valve;
    discharging said turbid liquid into a break tank;
    filling said break tank with said turbid liquid wherein said step of filling said break tank comprises:
        filling a first break tank with said turbid liquid;
        filling a second break tank with said turbid liquid from said first break tank;
        equalizing the turbid liquid in the first break tank with the turbid liquid in the second break tank;
        filling a third break tank with said turbid liquid from said second break tank; and
        equalizing the turbid liquid in said first, second and third break tanks;
    pumping said turbid liquid from said break tank to a self-cleaning portable liquid filter;
    filtering said turbid liquid through a screen filters thereby accumulating said particulates and contaminants on an internal surface of said screen filter;
    discharging a clean liquid from an outlet of said liquid filter; and
    engaging an automatic rinse cycle upon actuation of a signal triggered by sensing of a predetermined pressure differential across an inlet and an outlet of said screen filter.

4. The method for filtering particulates from a turbid liquid according to claim 3, wherein said step of engaging an automatic rinse cycle comprises:
    rinsing the accumulated particulates from said internal surface of the filter screen with a flush liquid;
    depositing said flush liquid and said accumulated particulates into a sludge tank located below said filter screen; and
    pumping said flush liquid and said accumulated particulates from said sludge tank to said break tank to be re-filtered.

* * * * *